UNITED STATES PATENT OFFICE.

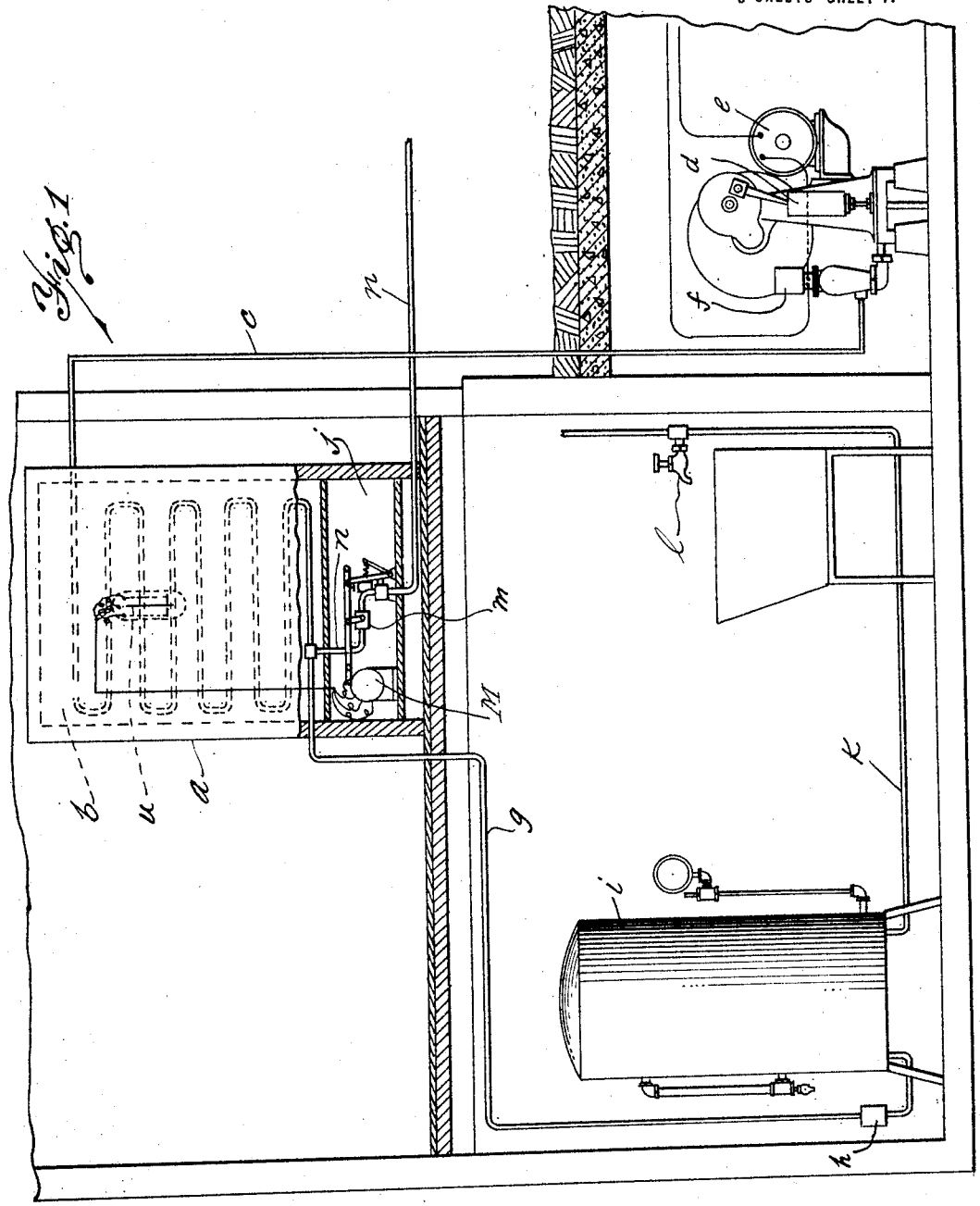

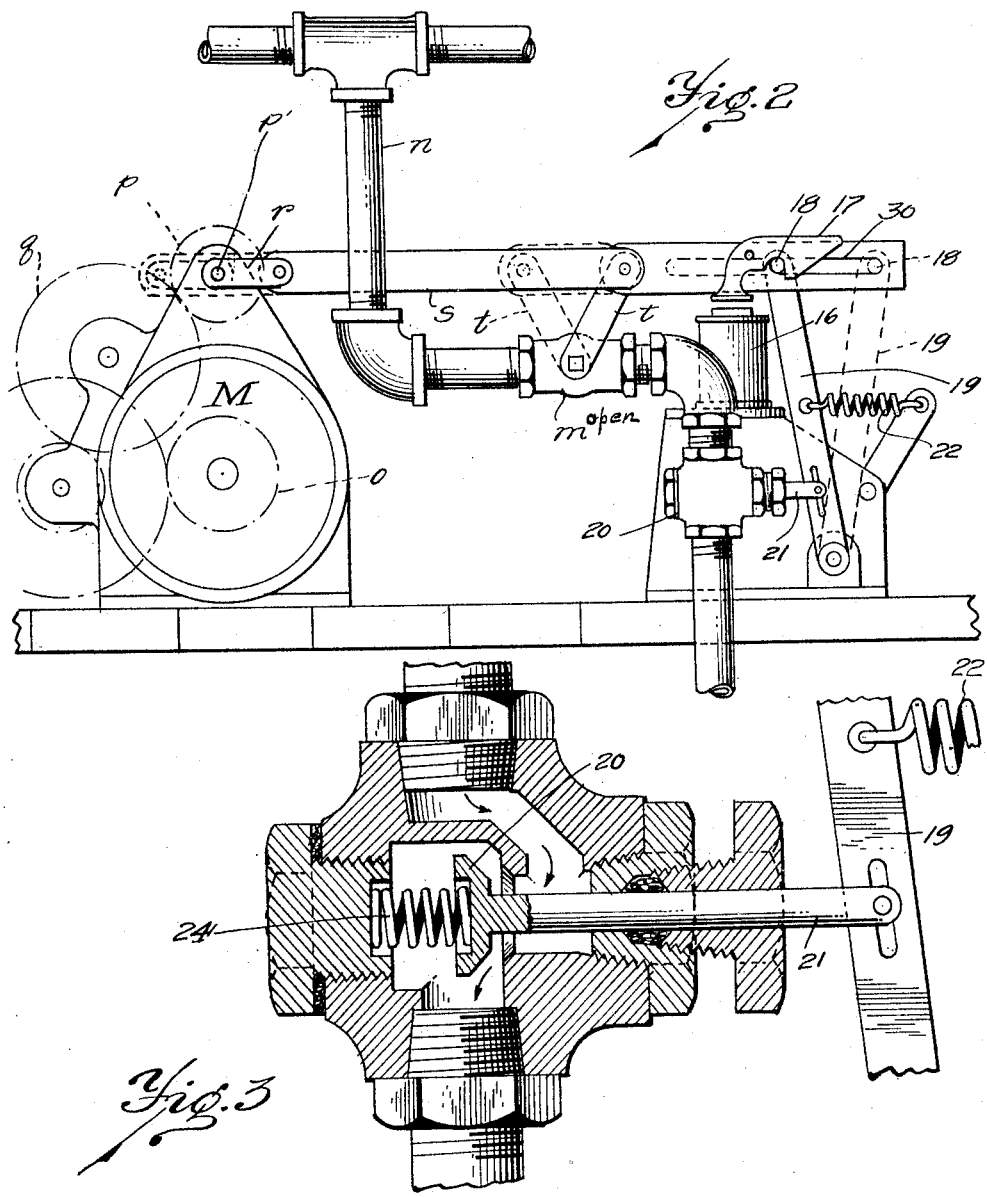

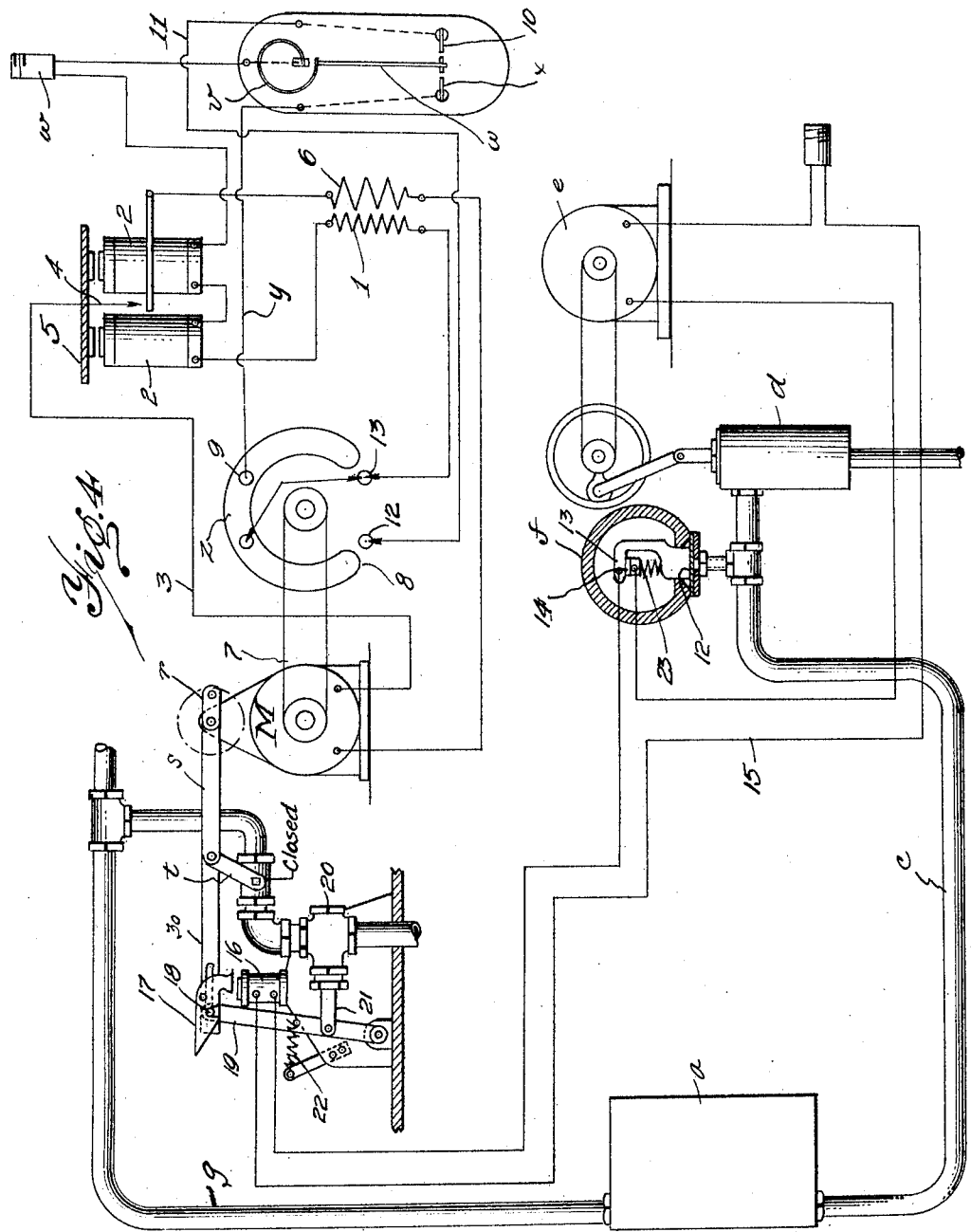

LLOYD G. COPEMAN, OF FLINT, MICHIGAN, ASSIGNOR TO EDWIN W. ATWOOD, OF FLINT, MICHIGAN.

REFRIGERATING APPARATUS.

1,412,775.     Specification of Letters Patent.     Patented Apr. 11, 1922.

Application filed February 14, 1921. Serial No. 444,658.

*To all whom it may concern:*

Be it known that I, LLOYD G. COPEMAN, a citizen of the United States, residing at Flint, in the county of Genesee and State of Michigan, have invented certain new and useful Improvements in Refrigerating Apparatus, of which the following is a specification.

This invention relates to refrigerating apparatus, and has for its object a refrigerating apparatus which utilizes the circulation of cold water through coils in the box to abstract the heat from the refrigerator. In order to promote the circulation in this line it is necessary to have a waste outlet to waste water periodically when the temperature of the box falls below a given degree. However, this wastage is unnecessary when any of the service taps are open or water is being used to fill the storage tank, or for any other purpose.

It is the object of the present invention to provide a control which automatically closes and keeps closed the waste opening when water is being drawn through the refrigerator for service purposes. This will be best understood when the detail is explained.

In the drawings,—

Fig. 1 is a side elevation of the entire system, some of the parts being in section.

Fig. 2 is a side elevation of the waste pipe valves and their control members.

Fig. 3 is an enlarged section of the auxiliary waste valve.

Fig. 4 is a diagram of the entire apparatus.

In my previous application #438,593, I have explained in considerable detail a refrigerating apparatus which works on the plan of utilizing cold water circulated through coils in a refrigerator to abstract the heat. This apparatus has a waste valve that is controlled by a thermostat. A motor opens and closes said valve when excited by current controlled by a thermostatically-controlled switch. The motor in all its details is set out in full in this application. Hence I do not deem it necessary in the present application to describe in detail these motor parts and connections. For that matter, any suitable connections could be used and I have only shown the connections graphically in the drawings attached to this application.

Now proceeding to the main description,—$a$ designates a refrigerator box in which are located a plurality of water coils $b$ in the water line $c$. This water line $c$ is furnished with water through a pump $d$ controlled by a motor $e$ which has a pressure-controlled switch $f$. Such a pump and such a pressure-controlled switch is old construction and installations of both the pump and the switch are to found in great numbers in rural communities where water is pumped from wells for general service purposes on the farm or in the house. The detail description of this pump and the pressure-controlled switch is given in my prior application above referred to. Suffice it to say here that when the pressure in the water line $c$ accumulates to, say, 60 pounds, it raises a diaphragm 12 (Fig. 4) which opens the motor circuit and consequently stops the pump. As soon as the pressure falls below 60 pounds the diaphragm drops and closes the circuit and starts the pump going. Obviously when any one of the taps is open the pressure will drop and the pump will start to work.

In my prior application the water for service purposes did not pass through the refrigerator box but the refrigerator box was simply on a branch line from the water main. However, in two of my subsequent applications I have described and claimed a refrigerator which is in the service line so that water drawn through the service taps promotes circulation through the refrigerator. These applications are Nos. 440,637 and 440,636.

It will be seen that the main $c$ passes through the coils $b$ and to the service main $g$ in which is located a check valve $h$. The service main $g$ then passes into the storage tank $i$ and emerges from the storage tank as the service line $k$ that has numerous taps, such for instance, as $l$. Now within the bottom of the refrigerator box is a machinery chamber $j$. In this is contained the motor M which opens and closes the valve $m$ in the waste line $n$. This motor is graphically detailed in Fig. 2, where it will be seen that the transmission wheel $o$ on the end of the armature shaft drives the wheel $p$ through the transmission wheels $q$. Obviously in practice these would be gears that are simply shown as wheels in the drawing for ease of illustration.

Secured to the shaft $p'$ is a crank arm $r$ connected by the link $s$ with the crank arm $t$ of the valve. This motor is controlled by a thermostatic switch is very carefully detailed in my first application #438,593. In this application this switch is only shown diagrammatically in Fig. 4. *u* is the arm controlled by a thermostat *v*. This stem *u* is in circuit with the wall plug *w*. Now suppose the thermostat, which from Fig. 1 it will be seen is in the refrigerator, is subjected to the influence of a rising temperature—the thermostat will expand, establishing a contact with the terminal *x*. The circuit can be traced then through the wire *y*, to the horse-shoe switch *z*, through this switch to the primary winding 1 of the transformer, thence through the magnets 2 back to the wall plug *w*. This is the primary circuit of the motor control. A secondary circuit is designated 3, which, it will be seen, goes through two terminals on the motor and through a switch 4 that is controlled by the armature 5 of the electric magnets 2 that are in the primary circuit. The secondary coil 6 is in the secondary circuit and serves, in connection with the primary coil 1 of the transformer, to step down the voltage of the current from the wall plug from the ordinary service voltage of about 110 or 120 volts to considerably smaller voltage more adapted for the motor. In the diagram it will be seen that the belt 7 drives the horse-shoe switch *z*. Every half rotation of the horse-shoe switch *z* breaks the primary circuit, for it will be apparent that when the end 8 of the horse-shoe switch clears over the terminal 9 that the circuit just traced through the primary will be broken; hence the motor will stop after having given the crank arm *r* half a rotation, which amounts to quarter of a turn of the bell crank arm *t*.

When the temperature in the box falls, due to the circulation of the cold water, the thermostat contracts and breaks the circuit and keeps on contracting until it establishes a circuit by the arm *u* contacting the opposite terminal 10. This establishes a circuit through the wire 11 to the contact 12, thence through the horse-shoe switch to the terminal 13, thence through the primary winding 1, the magnets 2, and back to the wall plug. This again closes the switch 4 in the primary, excites the motor, which turns the crank arm *r* through another half turn, closing the valve.

It is here that the improvement intended to be claimed in this application attaches. It will be seen that the pump *d* has, as already explained, the pressure-controlled switch *f*. When the pressure in the line rises the diaphragm 12 pushes up the terminal 13, separates the contacts 14, and breaks the circuit 15, which includes the motor *e* that controls the pump. There is also in this circuit a magnet 16 which controls a trigger 17 adapted to engage the stud 18 on the lever 19. The lever 19 is connected to the auxiliary valve 20 in the waste line by means of the stem 21. The spring 22 normally tends to pull the lever 19 outwardly and close the valve 20, but the trip 17 engaging the studs 18 prevents this occurring. However, when the valve *m* in the waste line opens, this obviously relieves the pressure on the pressure-controlled switch *f* and the switch contacts close by means of the spring 23. This starts the pump going and also the armature 16 attracts the trip 17, releasing the lever 19, and the spring 22, aided by the spring 24 in the valve, closes this valve 20. The springs that control this valve 20 can be nicely adjusted to make the valve 20 open only when the pressure on the valve reaches a point somewhat below the pressure necessary to open the circuit through the switch *f*. If the switch *f* cuts out the motor when 60 pounds of pressure is reached in the line, then the valve 20 might be operated nicely, say, with 50 pounds pressure. When the water in the waste line reaches 50 pounds pressure, it will open the valve and waste out.

In Fig. 2 it will be evident how the trigger 17 is controlled. The full line position of the crank arm *r*, the link *s* and the crank arm *t* shows the position of the parts just after the waste valve has been opened by the thermostat. The motor *e* is immediately energized by closing of the switch in its circuit, and this, as already explained, simultaneously energizes the magnet 16, disengaging the trip 17 from the stud 18. This allows the lever 19 to fly back to the dotted line position shown in Fig. 2. When the valve *m* is again closed by the motor M, swinging the crank arm *r* and the draft link *s* to the dotted line position shown in Fig. 2, this, of course, causes the draw bar 30 to pick up the stud 18 and drag it back into the recess of the trip, where it is again locked as soon as the magnet 16 is deenergized, which occurs as soon as the pressure builds up in the line and cuts out the pump.

The purpose of this auxiliary valve will be evident. When the main waste valve *m* opens due to the action of the thermostat, the water will start to waste and immediately the pressure in the line will fall, starting the pump going, at the same time closing the auxiliary waste valve. If no service taps are open and no water is being drawn through the service line, the pressure will quickly accumulate to 50 pounds and open the auxiliary waste valve and continue to waste the water. Obviously if any of the service taps are open at the time the main waste valve *m* is opened by the thermostat, then the auxiliary waste valve will remain closed, thereby saving wastage and allowing the circulation induced by the service use of the water to cool the refrigerator. On the other hand, even if no service tap is open at the time the thermostat opens the main waste valve *m*, as soon as the service tap is opened, due to the release of pressure, the waste auxiliary valve will immediately close, thereby saving wastage while water is being circulated through the refrigerator for service use.

As stated in my previous applications, it is possible to use the same apparatus for the purpose of keeping a food box exposed to the atmosphere in the winter at a sufficiently high temperature so that things will not freeze. All that it is necessary to do is simply to reverse the thermostatic connections and the water will serve to keep the box up to a temperature near that of the water. Hence it will be understood that this is simply a reversal of use and that although the parts are described and the elements are claimed with reference to their names and functions as relates to the use as a refrigerator, nevertheless I want it understood that these are words of description and not limitation.

What I claim is:

1. In a refrigerating apparatus, the combination of a refrigerator box, a water line passing through the box to influence the temperature therein and continuing on to form a service line and provided with a waste pipe, means for furnishing water to the water line, means for opening and closing the waste line at one place, and auxiliary means controlled by the pressure in the water line for closing the waste line and keeping it closed when the service line is being drawn upon.

2. In a refrigerating apparatus, the combination of a refrigerator box, a water line passing through the box for affecting the temperature therein and continuing on to form a service line and a waste line, pressure-controlled means for furnishing water to the water line, means for opening and closing the waste line at one place, and auxiliary means for closing the waste line until a determined pressure is accumulated in the waste line short of the pressure which controls the pumping means that supplies the water line.

3. In a refrigerating apparatus, the combination of a refrigerator box, a water line passing through the box for affecting the temperature therein and continuing on to form a service line and a waste line, thermostatically-controlled means for opening and closing the waste line at one point, a pump, a pressure-controlled switch for operating the pump controlled by the pressure accumulating in the water line, and an auxiliary valve in the waste line closed when the pump starts operation but capable of being opened by pressure accumulating in the waste line less than the pressure necessary to stop the pump.

4. In a refrigerating apparatus, the combination of a refrigerator box, a water line passing through the box for controlling the temperature therein, said water line continuing to form a service line and a waste line, a thermostatically-controlled valve for opening and closing the waste line at one point, an auxiliary valve capable of being opened by pressure accumulating in the waste line when the service line is not being drawn upon, means for closing said auxiliary valve when the thermostatically-controlled valve opens, and means for furnishing water to the water line controlled by a pressure greater than the pressure controlling the auxiliary valve.

5. In a refrigerating apparatus, the combination of a refrigerator box, a water line passing through the box to influence the temperature therein, said water line continuing on to form a service line and a waste line, a thermostatically-controlled valve for opening and closing the waste line at one place, an auxiliary valve for closing the waste line from discharge unless a given pressure accumulates in the waste line, a lever for controlling the opening and closing of said valve, a magnetically-controlled trip for holding said valve open, means for furnishing water to the water line when the pressure in the water line drops, and a switch and electric circuit controlled by the pressure in the water line for disengaging said trip from the lever to permit the lever to open the valve when the water supply means is started by the pressure in the water line, said auxiliary valve, however, remaining closed only until a pressure accumulates in the waste line somewhat below the pressure necessary to stop the water-supplying means.

6. In a refrigerating apparatus, the combination of a box, a water line passing through the box to influence the temperature therein and continuing on to form a service line and a waste line, a thermostat and valve for opening and closing the waste line, an auxiliary valve for controlling the discharge through the waste line, pumping means for supplying water to the water line when pressure falls therein, and an electromagnetically-controlled lever released when the pumping means starts for allowing the closing of the auxiliary valve and the waste line when the pressure in the water line accumulates to a point to start the pumping means, said auxiliary valve remaining closed only until a predetermined pressure is accumulated in the waste line somewhat less than the pressure necessary to start the pumping means.

In testimony whereof I affix my signature.

LLOYD G. COPEMAN.